Patented Nov. 14, 1944

2,362,670

UNITED STATES PATENT OFFICE 2,362,670

PROCESS FOR THE PRODUCTION OF LEAD SULPHIDE

Walter A. Schulze, Bartlesville, Okla., assignor to Phillips Petroleum Company, a corporation of Delaware No Drawing. Application January 2, 1942,
Serial No. 425,480

4 Claims. (Cl. 23—134)

This invention relates to the production of metal sulphides from organic sulphur compounds which yield hydrogen sulphide on hydrolysis. More specifically, this invention relates to the production of metal sulphides from carbonyl sulphide by a treatment with sulphide-forming metal salts. Still more particularly it relates to the reaction of carbonyl sulphide with heavy metal compounds to produce heavy metal sulphides.

Carbonyl sulphide, a compound rather closely resembling carbon disulphide in the matters of occurrence and chemical properties, is commonly present in coke oven gas, coal gas, carburetted water gas and producer gas. Also gases of petroleum origin such as those evolved when sulphur-bearing petroleum oils are subjected to cracking and reforming temperatures usually contain carbonyl sulphide.

Conventional treating agents of either acidic or strongly alkaline nature do not readily react with carbonyl sulphide. This behavior is typical of the carbon sulphides which are in general reactive only through the xanthogenate type of reaction. However carbonyl sulphide undergoes the following reaction with water under the proper conditions to produce carbon dioxide (or carbonic acid) and hydrogen sulphide.

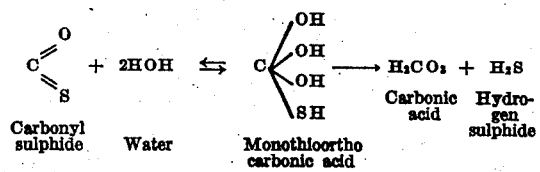

This differs from the ordinary inorganic hydrolysis reaction in that direct addition of water occurs first instead of any ionization of the primary material. Since both products of the reaction are acidic, carbonyl sulphide is stable toward aqueous non-oxidizing acid solutions and can exist indefinitely in contact with a 50 weight per cent aqueous solution of sulphuric acid.

My invention in its broader aspect involves reacting carbonyl sulphide with a heavy metal compound which is capable of forming an insoluble heavy metal sulphide, and preferably in the presence of water, in such manner as to convert the sulphur in the carbonyl sulphide to the insoluble heavy metal sulphide.

For example I may react carbonyl sulphide in the presence of water with an alkaline material to effect hydrolysis of the carbonyl sulphide to hydrogen sulphide, and react the resulting mixture either in situ or in a subsequent reaction zone (though preferably the former) with a heavy metal compound which is converted to the insoluble heavy metal sulphide by the hydrogen sulphide.

In accordance with this aspect of my invention, carbonyl sulphide is hydrolyzed to carbonic acid and hydrogen sulphide, and the hydrogen sulphide formed is substantially simultaneously reacted with an oxide, hydroxide, salt, or other compound of a heavy metal which is capable of forming an insoluble heavy metal sulphide. This may conveniently be effected by bringing the carbonyl sulphide, or material carrying the same, into contact under reactive conditions with an aqueous alkaline solution or suspension of the heavy metal compound, said solution or suspension having a pH greater than 7 and preferably of at least 8 and preferably not over 14. The alkaline material used to give this pH may be selected from the group consisting of the alkali metal hydroxides, carbonates, acetates and phosphates and ammonium aid the alkaline earth hydroxides.

The heavy metal compound may be selected from the group consisting of the salts, oxides and hydroxides of the heavy metals which are in the acid sulphide group, that is, which are precipitated as insoluble sulphides in aqueous acid medium by hydrogen sulphide. Examples of such metals are mercury, gold, silver, lead, copper, cadmium, bismuth, tin, antimony, molybdenum, etc.

Alternatively the heavy metal may be one from the basic sulphide group, that is, which are precipitated by hydrogen sulphide in basic solution, such as iron, zinc, manganese, cobalt, nickel, etc.

In accordance with another aspect of my invention, I may react carbonyl sulphide in the presence of water with an alkali metal salt of an acid in the anion of which appears an amphoteric heavy metal capable of forming an insoluble metal sulphide in the presence of water, such as for example with an alkali metal sulphide in the presence of water, such as for example with an alkali metal zincate, plumbite, stannate, stannite, etc.

Still further I may thermally react the carbonyl sulphide with a heavy metal oxide which is alkaline-reacting, i. e. which is capable of neutralizing the common acids, and which is capable of forming an insoluble heavy metal sulphide. In this way thermal reaction of the carbonyl sulphide with the oxide takes place to yield directly carbon dioxide and the heavy metal sulphide.

This reaction is preferably carried out between about 200° and about 700° F. Examples of suitable oxides are litharge, zinc oxide, manganese oxide, tin oxide, antimony oxide, bismuth oxide, etc. While this reaction is usually carried out in the complete or substantially complete absence of water, water may be present if desired.

I have found that promotion of the water addition reaction by the use of alkaline aqueous solution requires careful control of the pH. Thus, strongly alkaline solutions such as from about 10 to about 30 weight per cent solutions of caustic soda produce very slow conversion to the alkaline sulphide. The rate of reaction is more rapid in weakly alkaline solution, for example, with a pH greater than 7 and not over 14. However, with dilute solutions of sodium or potassium hydroxides or carbonates or the like, low capacity for the conversion is obtained since equilibrium is rather quickly reached with the sulphide and carbonate in solution.

I have discovered that the conversion of carbonyl sulphide to inorganic sulphides and especially heavy metal sulphides by aqueous solutions, is much improved when the conversion is carried out not only in the optimum pH range but also in the presence of a heavy metal salt, oxide, or hydroxide, capable of forming an insoluble metal sulphide. By this process, the most rapid hydrolysis is obtained without establishing an equilibrium and the formation of the heavy metal sulphide is smooth and complete up to the point of complete reaction of the heavy metal present.

The fact that carbonyl sulphide is converted to hydrogen sulphide by hydrolysis limits the hydrogen sulphide concentration in a gas mixture treated by my process to a value depending on the rate of hydrolysis and somewhat lower than the original carbonyl sulphide concentration. Under these circumstances, formation of the heavy metal sulphide proceeds without side reactions often induced by high concentrations or localized excess of hydrogen sulphide. Thus, my process does not induce oxidation and/or reduction reactions forming free sulphur, sulphur oxides or sulphides of mixed metal valence states. One of the advantages of the present invention is that the heavy metal sulphide produced is in very pure form and free from objectionable contaminants because of the absence of such undesirable side reactions.

Further, the reaction of $CO_2$, produced by hydrolysis, with the alkali or alkaline earth metal hydroxide or with the heavy metal compound to form carbonates is helpful in preventing localized sectors of altered pH in my reagents as a result of the reaction forming the metal sulphide. This is due to the buffering action of the carbonates which serves to maintain the desired pH range in the reagent medium.

In accordance with my invention, water-insoluble sulphides of heavy metals are produced by bringing carbonyl sulphide in gaseous form or in solution (usually non-aqueous) into contact with a reagent comprising a heavy metal salt, oxide, or hydroxide capable of reacting with hydrogen sulphide to form an insoluble sulphide, in an aqueous medium having a pH above 7. The alkaline aqueous medium preferably is limited to a maximum free alkali content corresponding to a pH of about 14, and the heavy metal compound may, according to its nature, be present as a solution or a suspension reactive to form the sulphide. A pH of at least 8 is preferred. In some cases a pH not exceeding 10 is desirable.

Since my process involves the preliminary addition of water to carbonyl sulphide, the conditions governing this reaction are highly important. The reaction is not ionic and therefore not entirely instantaneous and reaction time is therefore somewhat longer than would be provided for a metathetical reaction such as that between hydrogen sulphide, and a heavy metal salt. The necessary reaction time may be obtained by dividing the liquid reagent medium into a series of consecutive zones traversed in series by the carbonyl sulphide-containing reactant fluid or by employing the reagents in the form of adsorbed solutions or films on solid adsorbent carriers. This latter arrangement permits countercurrent flow of the reactant fluid and the contact time may be regulated by convenient means such as variation in flow rate and/or adjustment of the depth of the reagent bed in the direction of flow of the reactant fluid. Another alternative is available in filling the reaction chamber with non-porous inert solid for contact surface, and pumping the reagent countercurrent to the reactant fluid.

The reaction may be carried out at ordinary or at elevated temperatures. When operating at ordinary temperatures, say from about 40 to about 110° F., the reactant fluid may be passed in contact with one or more beds of reagent consisting of an adsorbent carrier such as fuller's earth, pumice, silica gel, bauxite or the like impregnated with an alkaline solution and/or suspension of a heavy metal salt, oxide, or hydroxide. Or, if desired, the reactant fluid may be contacted by various devices with an alkaline solution and/or suspension of said heavy metal salt, in the absence of the carrier.

When operating at elevated temperatures, similar solid type reagents are useful, and to avoid dehydration of the reagent, steam may be added to the reactant vapor prior to the conversion. Thus, when a mixture of steam and carbonyl sulphide is passed over an adsorbent carrier impregnated with an alkaline solution and/or suspension of a heavy metal salt, oxide, or hydroxide, the hydrolysis of carbonyl sulphide and the formation of the heavy metal sulphide proceeds rapidly. In fact, at elevated temperatures between about 200° and about 750° F., the pH of the reagent solution is of somewhat less importance to the hydrolysis and the alkaline material may be dispensed with, the mixture of reactant and water being passed over the catalyst, although nominally alkaline reagents prepared from an adsorbent carrier and a heavy metal oxide which exhibits alkaline properties (and is also capable of forming an insoluble sulphide), such as lead oxide, cadmium oxide, copper oxide, zinc oxide, bismuth oxide, are preferred. When natural metal oxide ores or synthetic metal oxide contact materials are of suitable hardness and porosity, the carrier may be dispensed with.

Further, the metal sulphide formation may be conducted as two separate reactions, if desired. In such cases, the hydrolysis of the carbonyl sulphide is accomplished by passage at elevated temperature together with steam over an alkaline contact material. The hydrogen sulphide thus formed may then be converted to the metal sulphide by contact in the same or in a separate zone with a reagent impregnated with a solution or suspension of a suitable metal salt, oxide, or hydroxide or by passage of the hydrogen sulphide-containing fluid into an aqueous heavy metal salt, oxide, or hydroxide, suspension or solution. These and many other modifications of my process will be obvious from this disclosure and hence are part of my invention.

The carbonyl sulphide from which the heavy metal sulphides are produced may be used in the form of more or less pure material, or it may be present in mixtures of varying concentrations with other gases or liquids such as normally gaseous or liquid hydrocarbons of petroleum, coal, shale oil or other origin. The reactant fluids should as far as possible be free of compounds which poison or spend the reagents useful in the process.

Pressures under which the process operates are usually either substantially atmospheric or low superatmospheric pressure since high pressures are not of great benefit except in increasing the contact time of gaseous reactants with the solid type reagents. If the reactants are liquids, sufficient pressure may be provided to prevent vaporization, or the liquid may, where readily volatile, be vaporized and then contacted with the hydrolysis and precipitating reagent. In general, operating pressures of 15 to 200 pounds gage may be selected.

The temperature of operation may be chosen in accordance with the previously-described methods of effecting the hydrolysis of carbonyl sulphide. Thus, the hydrolysis may be conducted at ordinary temperatures of from about 40 to about 110° F. with the reagents in aqueous alkaline media. When the hydrolysis is conducted at elevated temperatures in the presence of added water vapor, rapid reaction is obtained in the range of from about 200 to about 750° F.

The heavy metal salts, oxides, or hydroxides which may be used in preparing suitable reagents for the process are in general, compounds of any heavy metals which form water-insoluble sulphide e. g. with hydrogen sulphide. Certain of these while satisfactory from the standpoint of reactivity are less desirable for economic reasons, such as for example salts, oxides, or hydroxides of molybdenum, antimony, silver, gold, etc. Among those most useful are these compounds of mercury, lead, copper, cadmium, zinc, nickel, cobalt, iron, tin, manganese and bismuth. When prepared in an alkaline aqueous medium, many of these metal salts are converted to more or less water-insoluble hydroxides or oxides. Reagents may be prepared directly from alkaline suspensions of the metal carbonates, oxides or hydroxides. The medium containing the metal salt, oxides, or hydroxide, may be adsorbed on suitable carriers by having the carrier present when the metal salt, oxide, or hydroxide, solution and/or suspension is prepared and then evaporating excess water. Or the carrier may be sprayed with or soaked in an aqueous solution of a water soluble heavy metal salt and then treated with an alkali to impart the proper pH to the adsorbed aqueous phase and to form the heavy metal hydroxide or oxide, carbonate, bicarbonate, or other alkaline salt.

The choice of heavy metal reagent employed in the present invention will be determined by the heavy metal sulphide which it is desired to produce in accordance with my invention. The form of the reagent, i. e. whether on a carrier, etc. will depend upon the form of the desired final product.

Flow rates in my process are preferably those which provide adequate contact for complete conversion to the metal sulphide of the carbonyl sulphide in the reactant fluid, but which do not require excessive size in the reagent vessels. Thus, when treating gaseous mixtures containing carbonyl sulphide, space velocities of from about 50 to about 500 or more gas volumes per volume of reagent per hour are usually satisfactory although higher or lower values may be employed. When treating liquids, flow rates of from about 0.5 to about 10 liquid volumes per volume of reagent per hour generally assure adequate reaction time. In any case, the flow rate may be adjusted to correspond to the concentration of carbonyl sulphide in the reactant fluid and to other variables of the individual installation.

In appropriate cases, as where the heavy metal hydroxide is amphoteric, the treating reagent may comprise an alkali metal salt of an acid of the heavy metal. Thus, there may be used as hydrolyzing and/or precipitating reagent alkali zincate, plumbite, stannate, stannite, bismuthate, antimonate, etc., formed in any suitable way, and if desired in combination with free alkali metal hydroxide or carbonate or alkaline earth hydroxide.

As the alkaline material used to give a pH above 7, in accordance with the present invention, I may use alkali metal hydroxides, carbonates, acetates, or phosphates such as those of sodium, potassium, or lithium, ammonium hydroxide, ammonium phosphate, or alkaline earth metal hydroxides such as those of calcium, barium, strontium, or magnesium. Ammonium carbonate and acetate are probably not basic enough.

The heavy metal sulphides produced in accordance with the present invention may be put to any use in the arts for which they are suitable, such as catalysts, pigments, fillers, extenders, etc. The present invention furnishes a particularly advantageous way of converting heavy metal oxides or hydroxides to very pure corresponding sulphides.

The heavy metal sulphides supported on carriers, either with or without alkaline material, prepared in accordance with the present invention, are especially valuable for catalyzing certain reactions. Their being formed in situ in the pores of the carrier renders them particularly advantageous for use.

Reference is made to my copending application Serial No. 358,007, filed September 23, 1940, of which this application is a continuation in part, and to copending applications of Schulze et al., Serial No. 397,134 and 397,133, both filed June 7, 1941, which relate to the use of alkaline cadmium and copper, respectively, for conversion of carbonyl sulphide. Reference is also made to copending applications of Schulze et al., Serial Nos. 355,089 and 355,090, both filed August 31, 1940, which involve the use of a monoalkylolamine in conversion of carbonyl sulphide.

The following examples illustrate the principles of the invention using a number of specific reagents.

EXAMPLES 1 TO 5

A gaseous mixture of low-boiling hydrocarbons containing about 10 volume per cent of carbonyl sulphide was passed at atmospheric temperature and a flow rate of 200 gas volumes per hour per volume of reagent over solid-type reagents prepared from fuller's earth or pumice and alkaline aqueous solutions or suspensions of the metal salts. The reagents tested had compositions as follows:

Example 1

Fuller's earth impregnated with 5 per cent by weight of $CuSO_4$ in saturated aqueous solution followed by sufficient $Na_2CO_3$ solution to convert the copper to an aqueous alkaline mixture of hydroxide and carbonate containing sufficient free $Na_2CO_3$ to give the mixture a pH of 9.

Example 2

A reagent prepared in the same fashion as in Example 1 except that $CdSO_4$ replaced the $CuSO_4$.

Example 3

Fuller's earth bearing an aqueous 20% solution of sodium zincate containing no excess of NaOH over theoretical but showing a pH of 10.

Example 4

Pumice bearing a suspension of ferrous hydroxide in dilute ammonium hydroxide.

Example 5

Fuller's earth bearing a solution of $NiSO_4$ in ammonium hydroxide to produce 5 per cent by weight of salt as $Ni(NH_3)_4SO_4$ and containing free ammonium hydroxide to give a pH of 9.5.

Each reagent employed in the foregoing examples produced the heavy metal sulphide in calculated quantities based on the carbonyl sulphide passed over it, completely removing the carbonyl sulphide from the gas being treated. The treatment may be continued until the heavy metal content of the reagent has been completely converted to the sulphide.

Example 6

A mixture of carbonyl sulphide and methane containing 5 volume per cent of the sulphide was passed through three successive portions of cadmium sulphate solution made alkaline with sodium phosphate solution. Theoretical quantities of cadmium sulphide were obtained.

Example 7

A gas mixture containing 10 volume per cent of carbonyl sulphide was mixed with steam in a volume ratio of 3 parts gas to one part steam, this charge heated to 450° F., and passed over bauxite treated with 5 per cent by weight of $K_2CO_3$. The effluent gas was then passed through a continuous bed of reagent consisting of bauxite impregnated with ferrous hydroxide and ferrous sulphide was formed in an amount equivalent to the carbonyl sulphite charged.

Example 8

The carbonyl sulphide-containing gas mixture of Example 7 was passed at a temperature of 400° F. over litharge supported on crushed firebrick, under anhydrous conditions. Quantitative formation of lead sulphide resulted.

I claim:

1. A method for the production of lead sulphide which comprises passing carbonyl sulphide over lead oxide at a temperature between the approximate limits of 200° to 700° F.

2. A method for the production of lead sulphide which comprises passing carbonyl sulphide over an adsorbent carrier containing lead oxide at a temperature between the approximate limits of 200° to 700° F.

3. A method for the production of lead sulphide which comprises passing a mixture of carbonyl sulphide and normally gaseous hydrocarbons and steam over an adsorbent carrier containing lead oxide at a temperature between the approximate limits of 200° to 700° F.

4. A method for the production of lead sulphide which comprises passing a mixture of carbonyl sulphide and normally gaseous hydrocarbons and steam over a bauxite adsorbent carrier containing lead oxide at a temperature between the approximate limits of 200° to 700° F.

WALTER A. SCHULZE.